United States Patent
DeBano, Jr. et al.

[11] 3,810,654
[45] May 14, 1974

[54] OCCUPANT RESTRAINT CUSHION ASSEMBLY AND METHOD OF MANUFACTURE

[75] Inventors: John DeBano, Jr., Roseville; James L. Noll, Livonia, both of Mich.

[73] Assignee: General Motors Corporation, Detroit, Mich.

[22] Filed: May 5, 1972

[21] Appl. No.: 250,674

[52] U.S. Cl. ............ 280/150 AB, 141/10, 141/314, 150/1
[51] Int. Cl. ............................................ B60r 21/08
[58] Field of Search ........ 280/150 AB; 150/1, 28 R; 141/311, 313, 114, 10

[56] References Cited
UNITED STATES PATENTS

| | | | |
|---|---|---|---|
| 222,425 | 12/1879 | Smith | 150/1 |
| 2,152,745 | 4/1939 | Klass | 150/1 |
| 3,642,303 | 2/1972 | Irish | 280/150 AB |
| 3,638,755 | 2/1972 | Sack | 280/150 AB |
| 3,481,625 | 12/1969 | Chute | 280/150 AB |
| 2,755,125 | 7/1956 | Hodges | 280/150 AB |
| 870,215 | 11/1907 | Bates | 141/10 |

*Primary Examiner*—David Schonberg
*Assistant Examiner*—John P. Silverstrim
*Attorney, Agent, or Firm*—Herbert Furman

[57] ABSTRACT

An occupant restraint cushion of tapered cross section is manufactured from a single sheet of suitable material which is folded and stitched in a series of steps to complete the cushion. There is no cutting of the material to provide the desired shape to the cushion. The cushion includes a pair of body walls, an end wall integrally connecting the body walls and providing the basal end of the cushion, and side walls integral with the body walls and stitched to the end wall. The side walls have a center stitch line. The side walls adjacent their free ends are folded upon themselves and stitched to the body walls adjacent their free ends to provide the apical end of the cushion. One of the body walls is provided with an opening intermediate the side walls for receiving an inserted portion of a diffuser. The inserted portion of the diffuser is secured to the one body wall.

5 Claims, 10 Drawing Figures

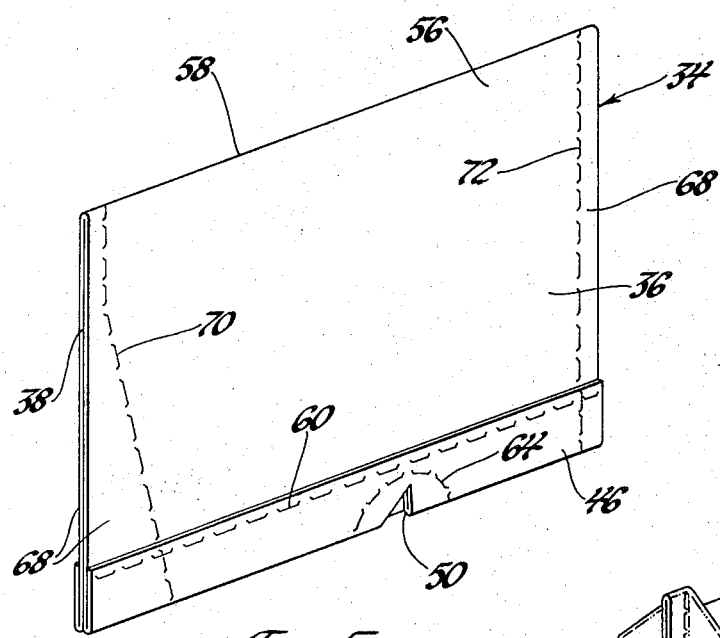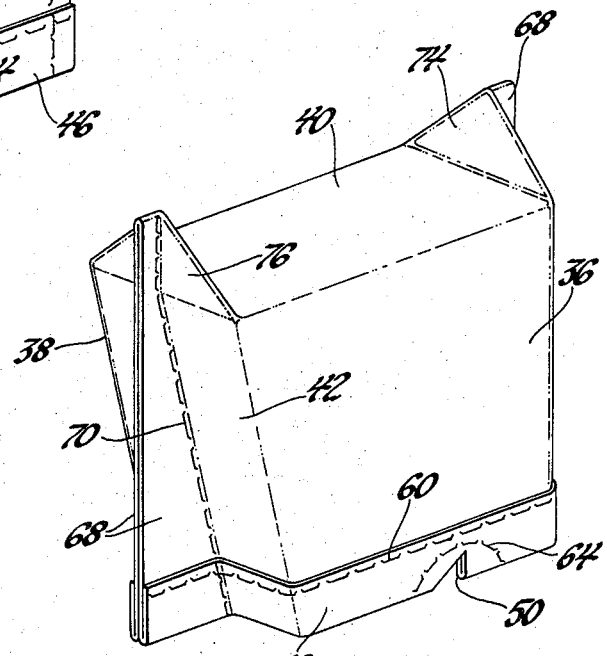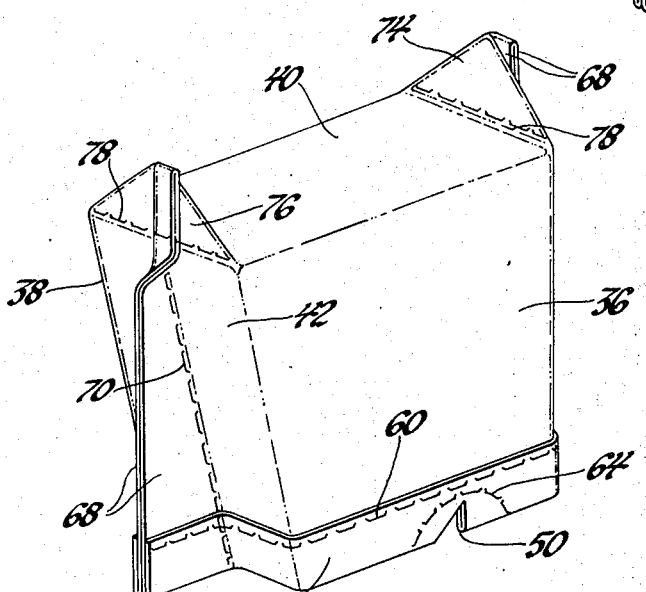

OCCUPANT RESTRAINT CUSHION ASSEMBLY AND METHOD OF MANUFACTURE

This invention relates to an occupant restraint cushion assembly and method of manufacture thereof.

Occupant restraint cushions are well known in the art. Such cushions may be of various shapes, and cushions of tapered shape are known. Generally such cushions are inflated from a diffuser which conventionally extends transversely of the cushion between the side walls thereof and adjacent the secured end of the cushion which is the apical end in a tapered cushion. Normally the diffuser extends through both of the side walls.

The cushion of this invention is of tapered shape but is assembled in an entirely different manner to a diffuser for inflation therefrom. The cushion includes upper and lower or body walls joined at one end by an integral end wall and having their side edges joined by side walls. The side walls are folded upon themselves adjacent their free ends to taper the body walls with respect to each other. The free ends of the body walls and folded ends of the side walls are secured to each other to provide the apical end of the cushion. An opening in one of the body walls between the side walls at this end receives an inserted portion of a diffuser. The inserted portion is secured to the one wall by means of grommets or rivets.

The cushion of this invention is manufactured from a single sheet of suitable material, such as neoprene-coated Dacron or nylon, or controlled porosity nylon or Dacron, and there is no cutting of any portion of the sheet of material to any pattern in order to obtain the cushion of desired tapered shape. Generally, in the preferred embodiment of the invention, a single sheet of material having selvage edges is folded upon itself to provide an envelope having body walls joined by an end fold. The selvage edges provide the side edges of the body walls and the free end edges of the body walls are cut edges. Each end edge portion is then folded back over a body wall and stitched to its respective body wall so that the end edges of the envelope are of double layer material. The side edges of the envelope are then stitched to each other. The body walls are then moved apart with respect to each other to form the secured selvage edges and the adjacent side edge portions of the body walls into generally planar side walls and to likewise form the end fold of the envelope and the adjacent end portions of the body wall into a generally planar end wall which subsequently becomes the basal end wall of the cushion. This end wall is, of course, bounded by lateral triangularly shaped extensions which are juxtaposed to like-shaped extensions of a respective side wall. The extensions are stitched to each other along their base edges. The resultant partially open envelope is then turned inside out. Subsequently, the free end edges and adjacent portions of the side walls are folded inwardly of themselves to taper the body walls with respect to each other. The folded end edges as well as the double layer end edges of the body walls are finally stitched to each other to complete the cushion. In one embodiment, a slit is cut in the end edge of one body wall and a flap is folded from the slit and stitched to the one wall after the double layer end edge portion of this wall is formed to provide an opening. The final stitching is interrupted at the resultant opening which receives the diffuser therethrough when the diffuser and cushion are assembled. In another embodiment, the slit is formed in the double layer end edge portion and is reinforced after the final stitching to provide the opening for the diffuser.

One feature of this invention is that it provides an occupant restraint cushion assembly wherein an occupant restraint cushion includes spaced body walls joined by an end wall portion and side wall portions, one of the body walls including an opening therethrough for receipt of an inserted portion of a diffuser. Another feature of this invention is that the inserted portion of the diffuser is secured to the one body wall. A further feature of this invention is that it provides an improved method of manufacturing an inflatable occupant restraint cushion from a planar sheet of suitable material through use only of stitching and folding and without cutting of the material to any pattern in order to obtain the desired resultant shape.

These and other features of this invention will be readily apparent from the following specification and drawings wherein:

FIG. 5 is a view of another step in the manufacture of the cushion;

FIG. 6 is a view of another step in the manufacture of the cushion;

FIG. 7 is a view of another step in the manufacture of the cushion;

Figure 1:
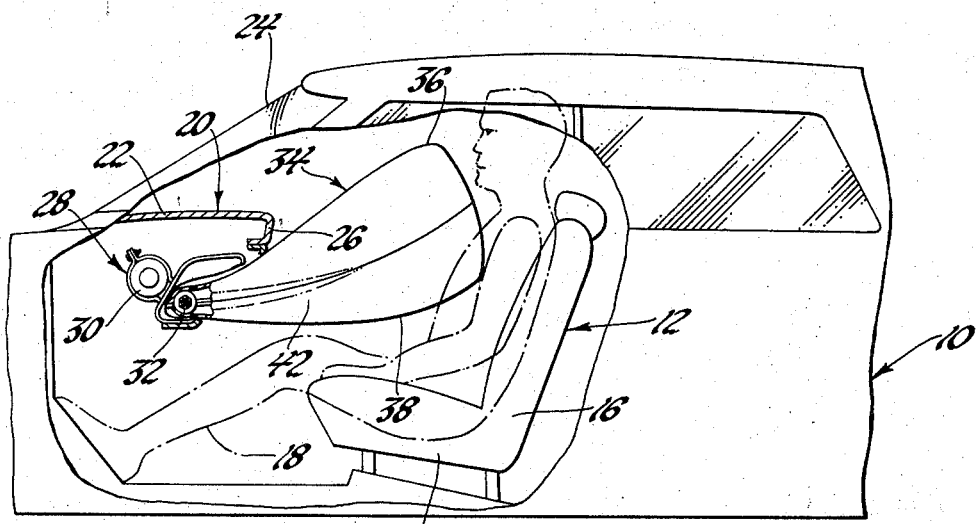
FIG. 1 is a partial view of a vehicle body embodying an occupant restraint cushion assembly according to this invention.

Referring now particularly to FIG. 1 of the drawings, a vehicle 10 is indicated schematically and includes a front seat 12 having a seat cushion 14 and a seat back 16 for supporting an occupant 18 in seated condition. The occupant 18 indicated as a 95th percentile male seated on the right-hand front seat of the vehicle.

The instrument panel 20 of the vehicle includes an upper surface 22 which faces the windshield 24 of the vehicle, a frontal surface 26 which is located in generally spaced juxtaposed relationship to the seat back 16 and torso of the seated occupant.

A conventional inflatable cushion restraint system 28 is schematically shown as including a gas generator or pressure vessel 30 providing a source of pressure fluid and sealed by a rupturable diaphragm. The vessel 30 communicates with a manifold, not shown, which in turn communicates with a diffuser 32 extending generally transversely of the vehicle and seated occupant below the frontal surface 26 of the instrument panel. A suitable sensor, not shown, senses acceleration pulses applied to the vehicle 10, and when a pulse of predetermined amplitude and time is received, the sensor furnishes a signal to communicate the source with the manifold and diffuser.

A generally tapered cushion 34 according to this invention is inflated by the pressure fluid from the diffuser and provides a restraint limiting the movement of the seated occupant with respect to the windshield 24 and the frontal surface 26 of the instrument panel.

Figure 2:
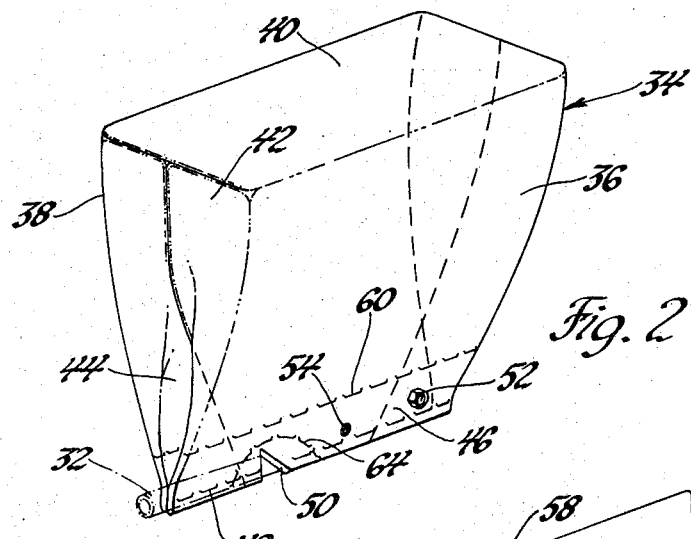
FIG. 2 is an enlarged view of a cushion assembly and diffuser according to one embodiment of the invention removed from the vehicle.

As best shown in FIG. 2, the cushion 34 includes upper and lower or body walls 36 and 38, and end or basal wall 40 and a pair of side walls 42. Each of the side walls 42 is partially folded upon itself at 44 and the end edges of this folded side wall portion and the end edge portions 46 of the walls 36 and 38 are stitched to themselves at 48 except at the generally triangularly shaped opening 50 formed in the one wall 36. The diffuser tube 36 is shown as inserted through the opening 50 into the interior of the cushion 34 and the inserted portion of the diffuser is secured to the one wall by means of a nut 52 threaded on a stud of the diffuser extending through a grommeted aperture in the one wall and also by means of a suitable blind rivet 54. Thus, the cushion 34 and the diffuser 32 are assembled to each other to provide a cushion assembly which is then assembled with the remainder of the system 28.

Figure 4:
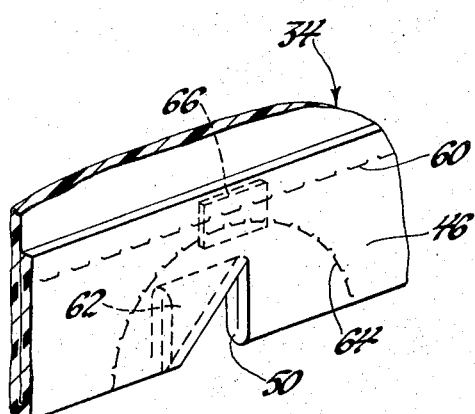
FIG. 4 is an enlarged view of a portion of FIG. 3.
Figure 3:
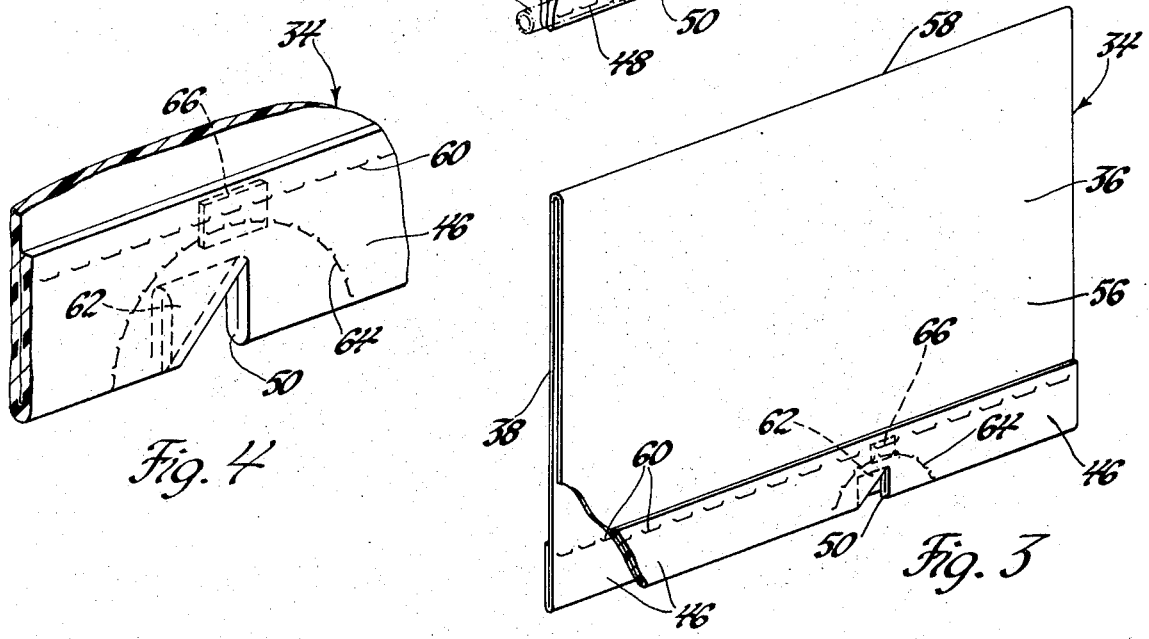
FIG. 3 is a view of the first steps in the method of manufacture of the cushion.

The manner in which the cushion 34 is manufactured will now be described with reference to FIGS. 3 through 8, inclusive. This method of manufacture requires no cutting to a pattern in order to obtain the desired tapered shape of the cushion as shown in FIGS. 1 and 2. In the first step, a sheet 56 of suitable material, such as neoprene coated nylon or Dacron or a material of suitable porosity, and having selvage side edges, is cut to length and folded upon itself as shown in FIG. 3 to form an open envelope having the body walls 36 and 38 and an end fold 58. The cut end edge portions of the walls 36 and 38 are folded back upon themselves as shown in FIG. 3 and are stitched to a respective wall at 60 to provide the end edge portions 46. With reference to FIGS. 3 and 4, a slit is provided in one of the end edge portions 46 and a flap 62 of the edge portion is folded back as shown in FIG. 4 to provide the opening 50. A row of stitching 64 surrounds the slit and flap and a reinforcement 66 for the slit edge may be stitched to the end edge portion 46 by the stitching 60. The aperture for rivet 54 and the grommeted aperture may be formed after the end edge portion 46 is formed.

As shown in FIG. 5, the selvaged side edge portions 68 of the walls 36 and 38 are then stitched to themselves at 70 and 72. The major portion of the row of stitching 70 is angular rather than linear or straight and this is because the resultant one side wall 42 of the cushion is to taper longitudinally of the cushion and of the vehicle as will be described. This row of stitching 70 may likewise be linear or straight.

Subsequently as shown in FIG. 6, the body walls 36 and 38 are moved apart from each other in generally parallel relationship to form the side walls 42 of the cushion by moving the stitching 70 and 72 into generally planar relationship with adjacent side edge portions of the walls 36 and 38. Simultaneously, the end fold 58 and the adjacent end edge portions of the walls 36 and 38 are formed into the end wall 40 of the cushion, with this end wall being bounded by triangularly shaped extensions 74 which are juxtaposed to like shaped extensions 76 of the side walls 42. The extensions 74 and 76 are then stitched to themselves at 78 as shown in FIG. 7.

Figure 8:
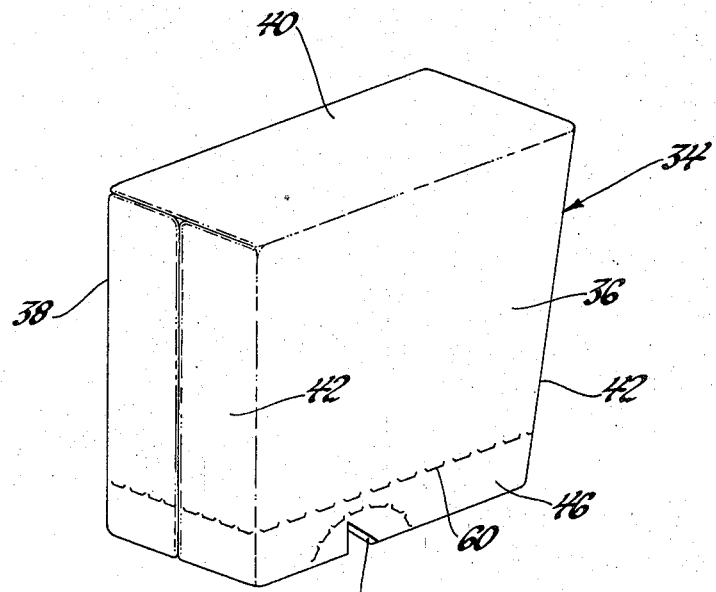
FIG. 8 is a view of another step in the manufacture of the cushion.

Subsequently the cushion is turned inside out as shown in FIG. 8. It will be noted that the plane of the right-hand wall 42 is generally angular to the longitudinal center line of the cushion and, of course, angular to the left-hand wall 42 which is shown in this Figure.

This is because the major portion of the row of stitching 70, as previously mentioned, is angular to the stitching 72, which is generally parallel to the center line of the cushion. If the right-hand wall 42 is desired to be parallel to the left-hand wall, then the stitchings 70 and 72 will be parallel to each other. Alternatively, the row of stitching 72 could likewise be angular as the row of stitching 70.

The portions of the side walls 46, adjacent their free ends, are then folded inwardly along the stitch lines 70 and 72 and the free end edge portions thereof and of the walls 36 and 38 are then stitched to each other at 48, FIG. 2, to complete the cushion.

From the foregoing description, it can be seen that the only cutting required is a slit for the opening 50. Further, the cushion may be made of the desired longitudinally tapered shape without cutting to any patterns. The shape of the stitch lines 70 and 72 control whether the side walls 42 of the cushion taper inwardly of the cushion toward the apical end thereof or whether these walls are generally parallel to the longitudinal center line of the cushion.

Figure 9:
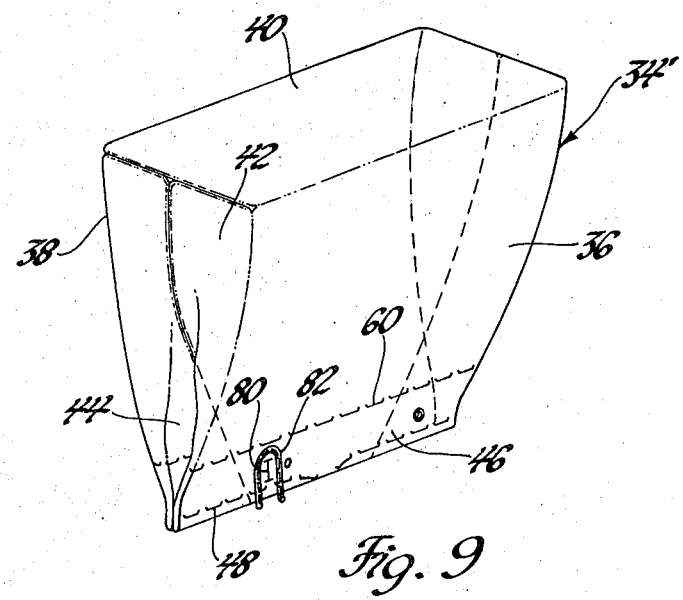
FIG. 9 is a view similar to FIG. 1 showing another embodiment.
Figure 10:
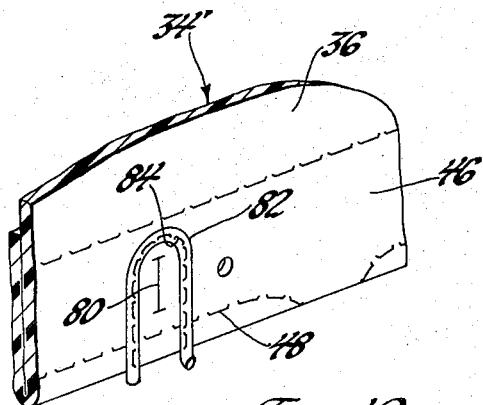
FIG. 10 is an enlarged view of a portion of FIG. 9.

FIGS. 9 and 10 show a modified cushion 34' which is generally the same as that previously described and therefore like numerals have been used for like parts. In the cushion 34', the edge portion 46 of wall 36 is provided with a generally I-shaped slit 80 which is reinforced as shown in FIG. 10 by a U-shaped piece of rope or heavy cording 82 which is stitched at 84 to the end edge portion 46 after this end edge portion is formed as previously set forth. It will further be noted that the stitching 48 is discontinuous so that the end edge portions 46 define an opening intermediate the side walls of the cushion 34'. This opening is to permit the diffuser 32 to be inserted within the cushion, although a portion of the diffuser will, of course, extend outwardly through the slit 80 for connection to the manifold as previously set forth in conjunction with the first embodiment. The opening defined by the unsecured end edge portions is closed after assembly of the cushion with the diffuser by means of a suitable clamp or clip.

Thus, this invention provides an improved occupant restraint cushion assembly and method of manufacture.

We claim:

1. A method of manufacturing an occupant restraint cushion comprising: folding a sheet of material upon itself to provide an open envelope having juxtaposed body walls joined by an end fold and including juxtaposed free side edges and free end edges; securing the free side edges of the body walls to each other; moving the body walls apart from each other to form the secured side edges, the portions of the body walls adjacent said secured side edges, and the portions of said free end edges adjacent said secured side edges into generally planar side walls, and to form the end fold and the end portions of the body walls adjacent said end fold into a generally planar end wall bounded by lateral triangular extensions juxtaposed to respective triangular extensions of the side walls; securing the triangular extensions to each other adjacent the bases thereof; turning the envelope inside out; folding the free end edge portions of each side wall upon themselves to partially fold each side wall inward of itself adjacent said free end edge portions thereof; securing the folded free end edge portions of the side walls and the free end edges of the body walls to each other, and providing an opening in one body wall intermediate the side walls to permit a portion of an elongated diffuser to extend from the cushion intermediate the side walls thereof.

2. An occupant restraint cushion assembly comprising, in combination, an inflatable cushion of generally tapered shape including spaced body walls joined at their basal ends by an end wall, joined at their sides by side walls, and secured to each other at their apical ends, an elongated diffuser member having a portion thereof extending into the cushion through an opening in one of the body walls adjacent the apical end thereof and intermediate the side walls, and means securing the portion of the diffuser member within the cushion to the one body wall.

3. A method of manufacturing an occupant restraint cushion comprising: folding a sheet of material upon itself to provide an open envelope having juxtaposed body walls joined by an end fold and including juxtaposed free side edges and free end edges; securing the free side edges of the body walls to each other; moving the body walls apart from each other to form the secured side edges, the portions of the body walls adjacent said secured side edges, and the portions of said free end edges adjacent said secured side edges into generally planar side walls, and to form the end fold and the end portions of the body walls adjacent said end fold into a generally planar end wall bounded by lateral triangular extensions juxtaposed to respective triangular extensions of the side walls; securing the triangular extensions to each other adjacent the bases thereof; turning the envelope inside out; folding the free end edge portions of each side wall upon themselves to partially fold each side wall inward of itself adjacent said free end edge portions thereof; securing the folded free end edge portions of the side walls and the free end edges of the body walls to each other, providing an opening in one body wall intermediate the side walls to permit a portion of an elongated diffuser to extend from the cushion through such one body wall, and providing means on said one body wall to permit another portion of said diffuser to be secured to said one body wall.

4. A method of manufacturing an occupant restraint cushion comprising: folding a sheet of material upon itself to provide an open envelope having juxtaposed body walls joined by an end fold and including juxtaposed free side edges and free end edges; folding the free end edge of each body wall over such body wall to provide each body wall with a double layer free end edge; securing the free side edges of the body walls to each other; moving the body walls apart from each other to form the secured side edges, the portions of the body walls adjacent said secured side edges, and the portions of said double layer free end edges adjacent said secured side edges into generally planar side walls, and to form the end fold and the end portions of the body walls adjacent said end fold into a generally planar end wall bounded by lateral triangular extensions juxtaposed to respective triangular extensions of the side walls; securing the triangular extensions to each other adjacent the bases thereof; turning the envelope inside out; folding the double layer free end edge portions of each side wall upon themselves to partially fold each side wall inward of itself adjacent said double layer free end edge portions thereof; securing the double layer folded free end edge portions of the side walls and the double layer free end edges of the body walls to each other, and providing an opening in one body wall intermediate the side walls to permit a portion of an elongated diffuser to extend from the cushion through said one body wall.

5. An inflatable occupant restraint cushion assembly comprising, in combination, an inflatable cushion including a pair of generally planar body walls tapering with respect to each other and joined adjacent their apical ends, an end wall joining the body walls adjacent their basal ends, and a pair of side walls joined to the body walls and to the end wall, each side wall being folded inward upon itself adjacent the apical ends of the body walls to accommodate the tapering of such body walls with respect to each other, an elongated diffuser member having a portion thereof extending outwardly of the cushion through an opening in one of the body walls adjacent the apical end thereof and intermediate the side walls, and means securing the diffuser member to the cushion.

* * * * *